US012304602B1

(12) United States Patent
Liu et al.

(10) Patent No.: US 12,304,602 B1
(45) Date of Patent: *May 20, 2025

(54) CONTROLLABLE SINKING AND FLOATING SWIMMING POOL ROBOT AND SINKING AND FLOATING CONTROL METHOD FOR SWIMMING POOL ROBOT

(71) Applicant: Aiper Global Pte. Ltd., Singapore (SG)

(72) Inventors: Xiaofeng Liu, Singapore (SG); Yongfei Hua, Singapore (SG)

(73) Assignee: Aiper Global Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/958,035

(22) Filed: Nov. 25, 2024

Related U.S. Application Data

(63) Continuation of application No. 18/822,334, filed on Sep. 2, 2024, now Pat. No. 12,221,196.

(30) Foreign Application Priority Data

Jul. 26, 2024 (CN) .......................... 202411017697.3

(51) Int. Cl.
*B63G 8/24* (2006.01)
*B25J 3/00* (2006.01)
(Continued)

(52) U.S. Cl.
CPC .................. *B63G 8/24* (2013.01); *B25J 3/00* (2013.01); *B63G 8/001* (2013.01); *E04H 4/1654* (2013.01);
(Continued)

(58) Field of Classification Search
CPC . B63G 8/00; B63G 8/001; B63G 8/24; G05D 1/467; B25J 3/00; E04H 4/1654
(Continued)

(56) References Cited

U.S. PATENT DOCUMENTS 11,124,982 B2 * 9/2021 Korenfeld ............. E04H 4/1654
11,274,462 B2 * 3/2022 Tryber .................. E04H 4/1654
(Continued)

FOREIGN PATENT DOCUMENTS

CN 116717122 A 9/2023
CN 116856767 A 10/2023
(Continued)

OTHER PUBLICATIONS

European search report, Application No. EP24199199.1, Mail Date Feb. 24, 2025.

*Primary Examiner* — Lars A Olson
(74) *Attorney, Agent, or Firm* — IPRO, PLLC

(57) ABSTRACT

The present disclosure relates to the field of underwater robots, and in particular to a controllable sinking and floating swimming pool robot and a sinking and floating control method for a swimming pool robot. The controllable sinking and floating swimming pool robot of the present disclosure includes a sinking and floating control unit configured to control a swimming pool robot to float and sink; a waterline detection unit configured to detect a positional relationship between the swimming pool robot and a waterline of a liquid surface of a swimming pool where the swimming pool robot is located; and a main control unit configured to control a working state of the sinking and floating control unit to enter a floating working state based on detection results to realize a floating of the swimming pool robot.

20 Claims, 9 Drawing Sheets

(51) Int. Cl.
  *B63G 8/00* (2006.01)
  *E04H 4/16* (2006.01)
  *G05D 1/467* (2024.01)
  *G05D 105/10* (2024.01)
  *G05D 107/00* (2024.01)

(52) U.S. Cl.
  CPC ....... *G05D 1/467* (2024.01); *B63G 2008/004* (2013.01); *G05D 2105/10* (2024.01); *G05D 2107/29* (2024.01)

(58) Field of Classification Search
  USPC ..................................................... 114/313
  See application file for complete search history.

(56) References Cited

U.S. PATENT DOCUMENTS

| | | |
|---|---|---|
| 2009/0301522 A1 | 12/2009 | Abehasera et al. |
| 2015/0267433 A1 | 9/2015 | Leonessa et al. |

FOREIGN PATENT DOCUMENTS

| | | |
|---|---|---|
| CN | 117822956 A | 4/2024 |
| WO | 2024008209 A1 | 1/2024 |

\* cited by examiner

Swimming Pool Robot 1

Swimming Pool Robot 1

CONTROLLABLE SINKING AND FLOATING SWIMMING POOL ROBOT AND SINKING AND FLOATING CONTROL METHOD FOR SWIMMING POOL ROBOT

This application is a continuation of U.S. application Ser. No. 18/822,334 filed on Sep. 2, 2024 which claims the priority to and benefit of Chinese Patent Application No. 2024110176973, filed on Jul. 26, 2024. For all purposes under the U.S. law, the entire disclosure of the above applications is incorporated by reference as part of the disclosure of this application.

FIELD OF THE INVENTION

The present disclosure relates to the field of underwater robots, and in particular to a controllable sinking and floating swimming pool robot and a sinking and floating control method for a swimming pool robot.

BACKGROUND OF THE INVENTION

With the development of artificial intelligence technologies, swimming pool robots have gradually become one of main solutions in the field of household and commercial swimming pool cleaning. Compared with traditional manual cleaning methods, the swimming pool robots can independently clean a bottom and wall surfaces of a swimming pool, which is faster, more effective and more economical.

The swimming pool robots needs to float or sink underwater and surface according to instructions or operational states to clean the bottom, walls and a waterline of the swimming pool and can be conveniently taken out of the swimming pool by users. The existing sinking and floating control method for the swimming pool robots realizes floating or sinking by changing a quality of the swimming pool robots themselves through water absorption and drainage, and the whole sinking and floating process takes a long time, resulting in a decrease in the working efficiency of the swimming pool robots.

SUMMARY OF THE INVENTION

The present disclosure is provided in view of the above problem. The present disclosure provides a controllable sinking and floating swimming pool robot and a sinking and floating control method for a swimming pool robot.

According to one aspect of the present disclosure, there is provided a controllable sinking and floating swimming pool robot, including: a sinking and floating control unit configured to control a swimming pool robot to float and sink; a waterline detection unit configured to detect a positional relationship between the swimming pool robot and a waterline of a liquid surface of a swimming pool where the swimming pool robot is located; and a main control unit configured to control a working state of the sinking and floating control unit, wherein the main control unit is capable of controlling the swimming pool robot to find a side wall or a slope based on operational requirement information of the swimming pool robot and enabling the swimming pool robot to crawl along the side wall or the slope; controlling the waterline detection unit to detect the positional relationship between the swimming pool robot and the waterline of the liquid surface of the swimming pool where the swimming pool robot is located; and controlling the sinking and floating control unit to enter a floating working state based on detection results to realize a floating of the swimming pool robot.

In addition, the controllable sinking and floating swimming pool robot according to one aspect of the present disclosure, further including a posture detection unit configured to detect a posture of the swimming pool robot, wherein the main control unit controls the waterline detection unit to start detecting the positional relationship in response to the posture meeting a first predetermined condition.

In addition, the controllable sinking and floating swimming pool robot according to one aspect of the present disclosure, the operational requirement information includes remote control command information sent by a user, clock information, operational task progress information, fault information, power information or swimming pool bottom environment information.

In addition, the controllable sinking and floating swimming pool robot according to one aspect of the present disclosure, further including a distance measurement unit or a map storage unit, wherein the main control unit controls the swimming pool robot to find the nearest side wall or the nearest slope based on distance measurement results of the distance measurement unit or map data in the map storage unit.

In addition, the controllable sinking and floating swimming pool robot according to one aspect of the present disclosure, the waterline detection unit includes an outlet water detection subunit configured to detect whether at least a part of the swimming pool robot has come out of water.

In addition, the controllable sinking and floating swimming pool robot according to one aspect of the present disclosure, the waterline detection unit further includes a proximity waterline detection subunit configured to detect whether the swimming pool robot has crawled to a distance less than or equal to a predetermined distance from the waterline.

In addition, the controllable sinking and floating swimming pool robot according to one aspect of the present disclosure, the sinking and floating control unit includes an inflation and deflation subunit and a switch subunit, wherein in response to the outlet water detection subunit detecting that at least a part of the swimming pool robot has come out of the water, the inflation and deflation subunit is controlled to start sucking air and the switch subunit is controlled to open, so that the sinking and floating control unit enters the floating working state.

In addition, the controllable sinking and floating swimming pool robot according to one aspect of the present disclosure, the sinking and floating control unit includes an inflation and deflation subunit and a switch subunit, wherein in response to the proximity waterline detection subunit detecting that the swimming pool robot has crawled to the distance less than or equal to the predetermined distance from the waterline, the inflation and deflation subunit is controlled to start sucking air, and in response to the outlet water detection subunit detecting that at least a part of the swimming pool robot has come out of the water, the switch subunit is controlled to open, so that the sinking and floating control unit enters the floating working state.

In addition, the controllable sinking and floating swimming pool robot according to one aspect of the present disclosure, the sinking and floating control unit further includes an airbag subunit connected to the inflation and deflation subunit, wherein the airbag subunit is connected to or disconnected from outside atmosphere through the inflation and deflation subunit and the switch subunit.

In addition, the controllable sinking and floating swimming pool robot according to one aspect of the present disclosure, the sinking and floating control unit further includes an air inlet and outlet subunit, wherein the switch subunit is connected to the outside atmosphere through the air inlet and outlet subunit.

In addition, the controllable sinking and floating swimming pool robot according to one aspect of the present disclosure, the main control unit is further capable of controlling the sinking and floating control unit to enter a sinking working state based on the operational requirement information of the swimming pool robot to realize a sinking of the swimming pool robot.

In addition, the controllable sinking and floating swimming pool robot according to one aspect of the present disclosure, controlling the sinking and floating control unit to enter the sinking working state includes controlling the switch subunit to open and controlling the inflation and deflation subunit to discharge air in the airbag subunit.

In addition, the controllable sinking and floating swimming pool robot according to one aspect of the present disclosure, the inflation and deflation subunit includes an air pump assembly, and the switch subunit includes an electromagnetic valve assembly or a two-position three-way valve assembly.

In addition, the controllable sinking and floating swimming pool robot according to one aspect of the present disclosure, in response to the outlet water detection subunit detecting that at least a part of the swimming pool robot enters underwater again and/or the posture detection unit detecting that the posture of the swimming pool robot meets a second predetermined condition, the inflation and deflation subunit and the switch subunit are controlled to be closed.

In addition, the controllable sinking and floating swimming pool robot according to one aspect of the present disclosure, the inflation and deflation subunit and the switch subunit are controlled to be closed after the sinking and floating control unit enters the floating working state for a predetermined time.

In addition, the controllable sinking and floating swimming pool robot according to one aspect of the present disclosure, further including a water pump unit configured to pump liquid in the swimming pool where the swimming pool robot is located and discharge the liquid to drive the swimming pool robot, wherein a power of the water pump unit is changed after the sinking and floating control unit enters the floating working state or after the swimming pool robot climbs the side wall or the slope.

According to another aspect of the present disclosure, there is provided a sinking and floating control method for a swimming pool robot, including: controlling a swimming pool robot to find a side wall or a slope based on operational requirement information of the swimming pool robot, and enabling the swimming pool robot to crawl along the side wall or the slope; detecting a positional relationship between the swimming pool robot and a waterline of a liquid surface of a swimming pool where the swimming pool robot is located; and controlling a sinking and floating control unit to enter a floating working state based on detection results to realize a floating of the swimming pool robot.

In addition, the sinking and floating control method for a swimming pool robot according to another aspect of the present disclosure, detecting the positional relationship between the swimming pool robot and the waterline of the liquid surface of the swimming pool where the swimming pool robot is located includes: starting detecting the positional relationship in response to a posture of the swimming pool robot meeting a first predetermined condition.

In addition, the sinking and floating control method for a swimming pool robot according to another aspect of the present disclosure, the operational requirement information includes remote control command information sent by a user, clock information, operational task progress information, fault information, power information or swimming pool bottom environment information.

In addition, the sinking and floating control method for a swimming pool robot according to another aspect of the present disclosure, controlling the sinking and floating control unit to enter the floating working state based on detection results to realize the floating of the swimming pool robot includes: controlling the sinking and floating control unit to enter the floating working state in response to detecting that at least a part of the swimming pool robot has come out of water.

In addition, the sinking and floating control method for a swimming pool robot according to another aspect of the present disclosure, further including: controlling the sinking and floating control unit to stop working in response to detecting that at least a part of the swimming pool robot enters underwater again and/or detecting that the posture of the swimming pool robot meets a second predetermined condition.

As described in detail below, the controllable sinking and floating swimming pool robot and the sinking and floating control method for the swimming pool robot according to embodiments of the present disclosure, the sinking and floating control of the swimming pool robot can be realized by inflating and deflating the airbag with the air above the water level line, thereby having a faster sinking and floating speed compared to the solution of changing a quality of the swimming pool robot itself to realize floating or sinking through water absorption and drainage, and simplifying the configuration of internal components. In the sinking and floating control method, by monitoring the working state and the posture of the swimming pool robot based on operational requirements of the swimming pool robot, starting detecting the positional relationship between the swimming pool robot and the waterline of the liquid surface of the swimming pool where the swimming pool robot is located, and starting each component of the sinking and floating control unit in stages according to detection results of the positional relationship, more accurate floating and sinking control can be realized, and the correct posture of the swimming pool robot in the whole operational process can be ensured.

BRIEF DESCRIPTION OF DRAWINGS

Through a more detailed description of embodiments of the present disclosure in combination with the drawings, the foregoing and other features and advantages of the present disclosure are more obvious. The drawings are used to provide a further understanding of embodiments of the present disclosure present disclosure, constitute a part of this specification, and are used, together with the embodiments of the present disclosure, to explain the present disclosure, but do not constitute limitations to the present disclosure. In the drawings, the same reference numerals generally represent the same components or steps.

DETAILED DESCRIPTION OF THE INVENTION

In order to make technical solutions and advantages of the present disclosure more obvious, exemplary embodiments according to the present disclosure are described in detail below with reference to the drawings. Apparently, the described embodiments are merely some but not all of the embodiments of the present disclosure. It is to be understood that, the present disclosure is not limited by the exemplary embodiments described herein.

Figure 1:
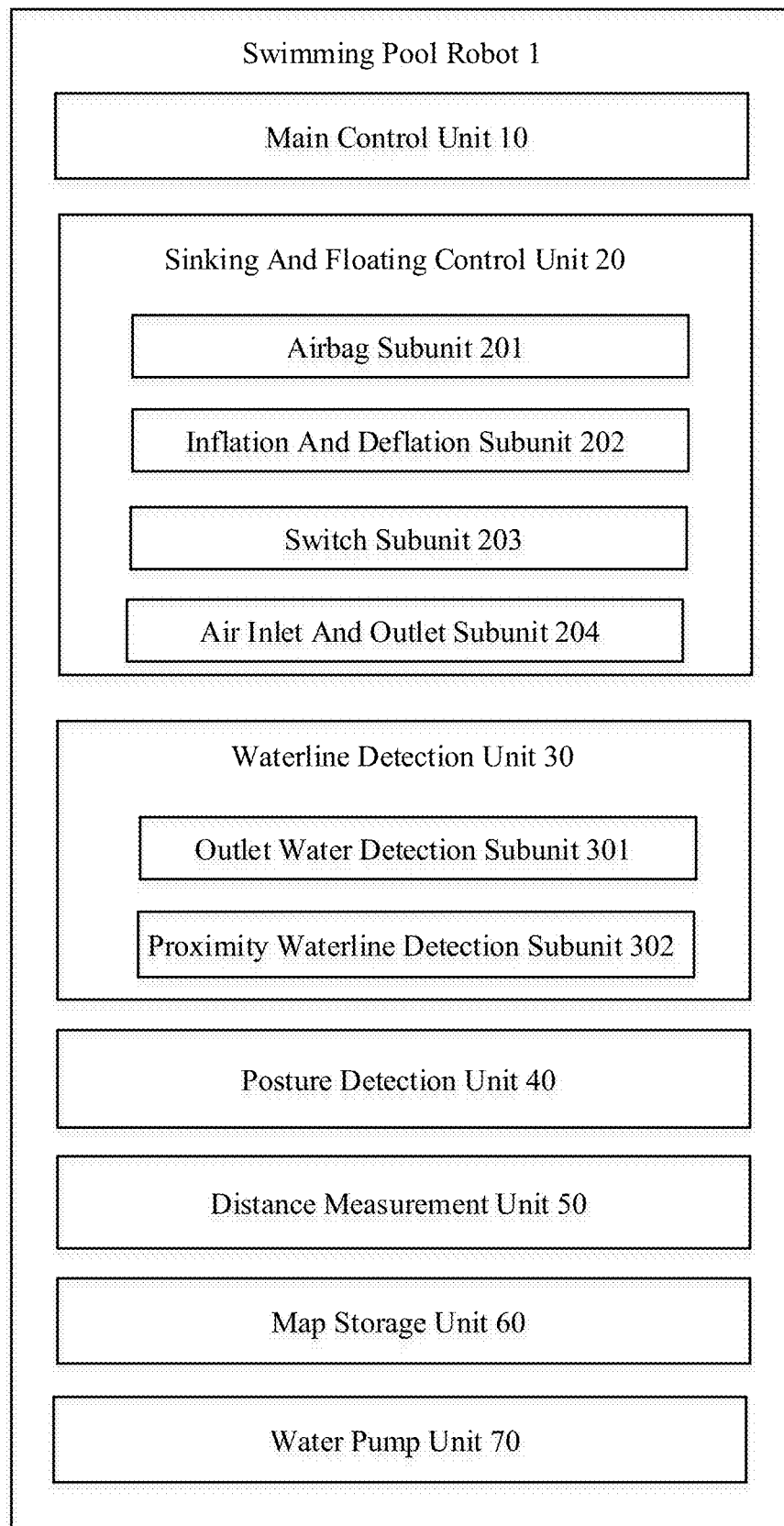
FIG. 1 is a component block diagram illustrating a swimming pool robot according to an embodiment of the present disclosure.
Figure 2A:
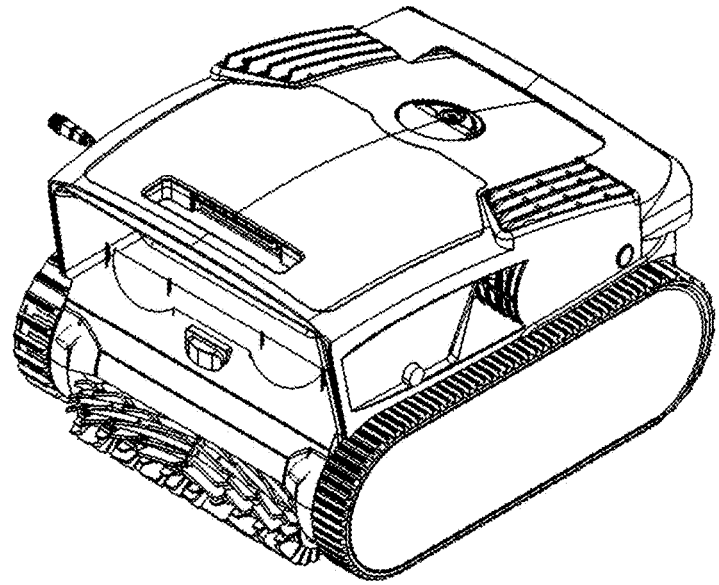
FIG. 2A and FIG. 2B are schematic diagrams illustrating a swimming pool robot according to an embodiment of the present disclosure.
Figure 2B:
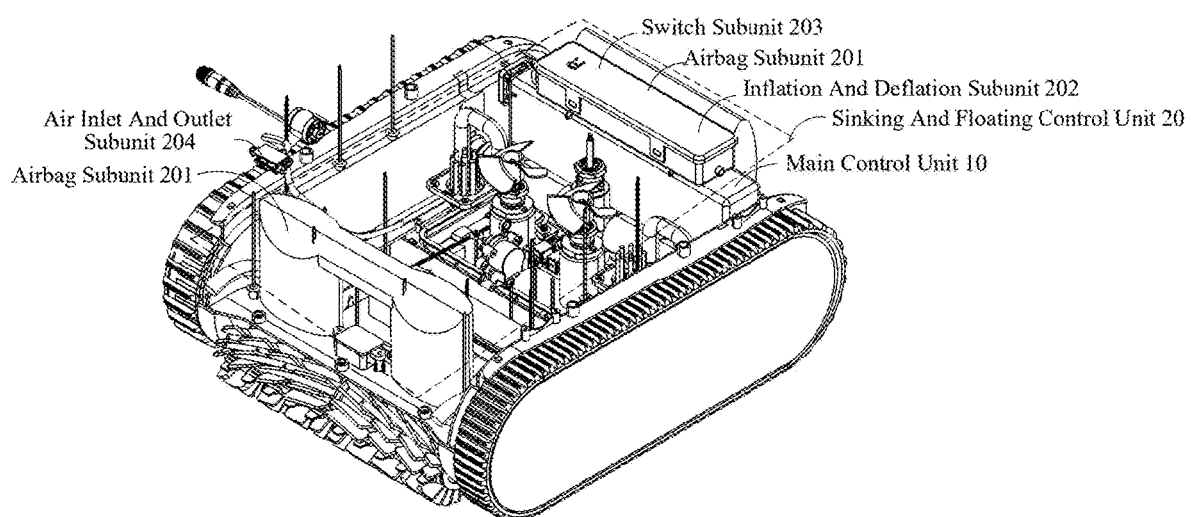

First, a swimming pool robot according to embodiments of the present disclosure will be described with reference to FIG. 1, FIG. 2A and FIG. 2B. FIG. 1 is a component block diagram illustrating a swimming pool robot according to an embodiment of the present disclosure. FIG. 2A is an overall schematic diagram illustrating a swimming pool robot according to an embodiment of the present disclosure. FIG. 2B is a schematic diagram illustrating cross-sectional components of a swimming pool robot according to an embodiment of the present disclosure.

As shown in FIG. 1, FIG. 2A and FIG. 2B, the swimming pool robot 1 according to the embodiments of the present disclosure at least includes a main control unit 10, a sinking and floating control unit 20, a waterline detection unit 30, a posture detection unit 40, a distance measurement unit 50, a map storage unit 60 and a water pump unit 70. It should be understood that only components related to the sinking and floating control method according to the embodiments of the present disclosure are shown in FIG. 1, FIG. 2A and FIG. 2B, and the swimming pool robot 1 according to the embodiments of the present disclosure is not limited to this, but can further include a driving unit, a cleaning unit, a communication unit and the like. In addition, it should be understood that the position and the number of each component in FIG. 2B are only exemplary, and the swimming pool robot 1 according to the embodiments of the present disclosure is not limited to this.

The main control unit 10 is configured to control each component of the swimming pool robot 1 according to the embodiments of the present disclosure. For example, in the sinking and floating control method for a swimming pool robot according to the embodiments of the present disclosure described in detail below, the main control unit 10 controls the sinking and floating control unit 20 based on operational requirements of the swimming pool robot 1 and according to detection results of the waterline detection unit 30, the posture detection unit 40, the distance measurement unit 50, and the like, so as to control a floating and a sinking of the swimming pool robot 1. Specifically, the main control unit 10 can control the swimming pool robot 1 to find a side wall or a slope based on operational requirement information of the swimming pool robot 1, and enable the swimming pool robot 1 crawl along the side wall or the slope; further, control the waterline detection unit 30 to detect a positional relationship between the swimming pool robot 1 and a waterline of a liquid surface of a swimming pool where the swimming pool robot 1 is located; and control the sinking and floating control unit 20 to enter a floating working state based on detection results to realize a floating of the swimming pool robot 1. Accordingly, the main control unit 10 can further control the sinking and floating control unit 20 to enter a sinking working state based on the operational requirement information to realize a sinking of the swimming pool robot 1.

More specifically, the operational requirement information includes remote control command information sent by a user, clock information, operational task progress information, fault information, power information or swimming pool bottom environment information. That is, the remote control command information, the clock information, the operational task progress information, the fault information, the power information or the swimming pool bottom environment information instruct the swimming pool robot 1 to switch to a floating state to clean a waterline area, come out of water and charge or maintain; or instruct the swimming pool robot 1 to switch to a sinking state to clean a pool bottom and/or a sidewall area.

The sinking and floating control unit 20 is configured to control the swimming pool robot 1 to float and sink. As shown in FIG. 2B, the sinking and floating control unit 20 includes an airbag subunit 201, an inflation and deflation subunit 202, a switch subunit 203 and an air inlet and outlet subunit 204. The airbag subunit 201 is connected to the inflation and deflation subunit 202, so that the airbag subunit 201 is connected to the outside atmosphere through the inflation and deflation subunit 202, the switch subunit 203 and the air inlet and outlet subunit 204. In the floating working state, the inflation and deflation subunit 202 is turned on to suck air from the outside and the switch subunit 203 is turned on. The air above a water level line enters the airbag subunit 201 through the air inlet and outlet subunit 204, the switch subunit 203 and the inflation and deflation subunit 202, so that a volume of the airbag subunit 201 becomes larger and a buoyancy of the swimming pool robot 1 is increased to float. In the floating state, the inflation and deflation subunit 202 and the switch subunit 203 are turned off, the airbag subunit 201 is disconnected from the outside atmosphere, and the swimming pool robot 1 remains floating. In the sinking working state, the inflation and deflation subunit 202 is turned on to extract air from the airbag subunit 201, and the switch subunit 203 is turned on, the air in the airbag subunit 201 is discharged through the inflation and deflation subunit 202, the switch subunit 203 and the air inlet and outlet subunit 204, so that the volume of the airbag subunit 201 becomes smaller and the buoyancy of the swimming pool robot 1 is reduced to sink.

Figure 3:
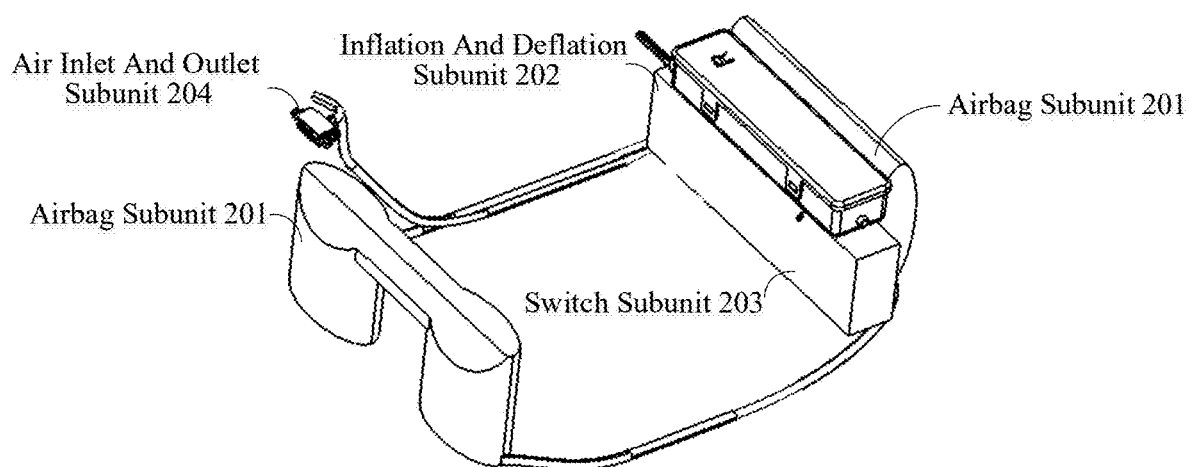
FIG. 3 is a schematic diagram illustrating a sinking and floating control unit of a swimming pool robot according to an embodiment of the present disclosure.

Further, a sinking and floating control unit of a swimming pool robot according to the embodiments of the present disclosure will be described with reference to FIG. 3. FIG. 3 is a schematic diagram illustrating a sinking and floating control unit of a swimming pool robot according to an embodiment of the present disclosure.

As shown in FIG. 3, the sinking and floating control unit 20 of the swimming pool robot according to the embodiment of the present disclosure includes two airbag subunits 201 connected in series. The two airbag subunits 201 are respectively arranged at a front and a rear of the swimming pool robot 1, thereby facilitating the balance of the swimming pool robot 1 and the inflation of the airbag subunits 201. The airbag subunits 201, the inflation and deflation subunit 202, the switch subunit 203 and the air inlet and outlet subunit 204 are connected to each other through an air pipe.

Figure 4:
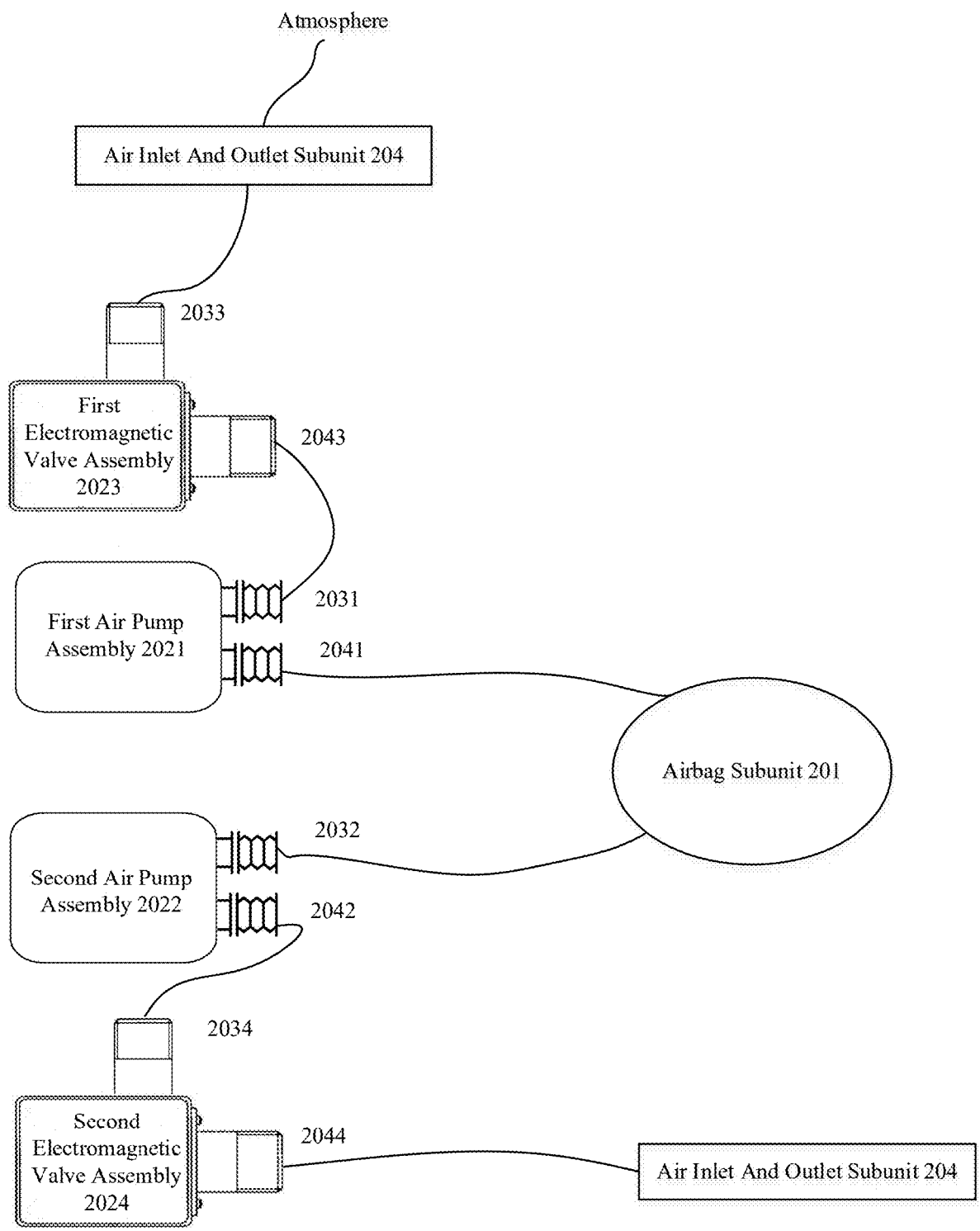
FIG. 4 is a schematic diagram further illustrating an example of a sinking and floating control unit of a swimming pool robot according to an embodiment of the present disclosure.
Figure 5:
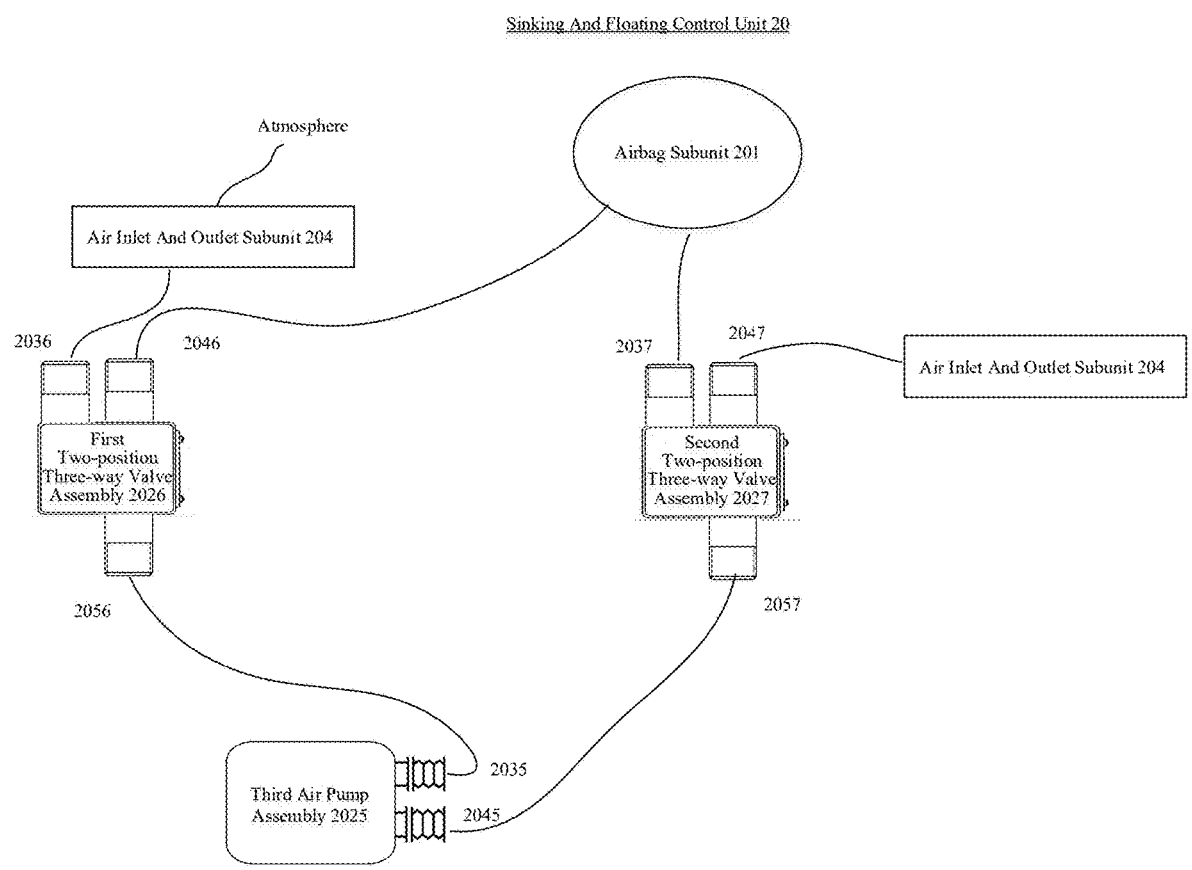
FIG. 5 is a schematic diagram further illustrating another example of a sinking and floating control unit of a swimming pool robot according to an embodiment of the present disclosure.

Further, the sinking and floating control unit of the swimming pool robot according to the embodiments of the present disclosure will be described with reference to FIG. 4 and FIG. 5. FIG. 4 is a schematic diagram further illustrating an example of a sinking and floating control unit of a swimming pool robot according to an embodiment of the present disclosure. FIG. 5 is a schematic diagram further illustrating another example of a sinking and floating control unit of a swimming pool robot according to an embodiment of the present disclosure.

As shown in FIG. 4, the inflation and deflation subunit 202 includes a first air pump assembly 2021 and a second air pump assembly 2022, and the switch subunit 203 includes a first electromagnetic valve assembly 2023 and a second electromagnetic valve assembly 2024. An inlet 2033 of the first electromagnetic valve assembly 2023 is connected to the air inlet and outlet subunit 204, an outlet 2043 of the first electromagnetic valve assembly 2023 is connected to an air inlet port 2031 of the first air pump assembly 2021, an air outlet port 2041 of the first air pump assembly 2021 is connected to the airbag subunit 201, and an inlet 2034 of the second electromagnetic valve assembly 2024 is connected to an air outlet port 2042 of the second air pump assembly 2022. An outlet 2044 of the second electromagnetic valve assembly 2024 is connected to the air inlet and outlet subunit 204, and an air inlet port 2032 of the second air pump assembly 2022 is connected to the airbag subunit 201.

In the floating working state, the first air pump assembly 2021 and the second air pump assembly 2022 are in a power-on working state, and the first electromagnetic valve assembly 2023 and the second electromagnetic valve assembly 2024 are in a power-off state. The air above the water level where the swimming pool robot 1 is located enters the first air pump assembly 2021 through the air inlet and outlet subunit 204 and the first electromagnetic valve assembly 2023, and is filled into the airbag subunit 201 through the first air pump assembly 2021.

In the sinking working state, the first air pump assembly 2021 and the second air pump assembly 2022 are in the power-off state, the first electromagnetic valve assembly 2023 and the second electromagnetic valve assembly 2024 are in the power-on working state. The air in the airbag subunit 201 enters the second air pump assembly 2023 and is discharged through the second air pump assembly 2023, the second electromagnetic valve assembly 2024 and the air inlet and outlet subunit 204.

As shown in FIG. 5, the inflation and deflation subunit 202 includes a third air pump assembly 2025, and the switch subunit 203 includes a first two-position three-way valve assembly 2026 and a second two-position three-way valve assembly 2027. A first port 2036 of the first two-position three-way valve assembly 2026 is connected to the air inlet and outlet subunit 204, a second port 2046 of the first two-position three-way valve assembly 2026 is connected to the airbag subunit 201, and a third port 2056 of the first two-position three-way valve assembly 2026 is connected to an air inlet port 2035 of the third air pump assembly 2025. A first port 2037 of the second two-position three-way valve assembly 2027 is connected to the air inlet and outlet subunit 204, a second port 2047 of the second two-position three-way valve assembly 2027 is connected to the airbag subunit 201, and a third port 2057 of the second two-position three-way valve assembly 2027 is connected to an air outlet port 2045 of the third air pump assembly 2025.

In the floating working state, the first two-position three-way valve assembly 2026 and the third air pump assembly 2025 are in the power-on working state, and the second two-position three-way valve assembly 2027 is in the power-off state. The air above the water level line where the swimming pool robot 1 is located enters the third air pump assembly 2025 through the air inlet and outlet subunit 204 and the first two-position three-way valve assembly 2026, and is filled into the airbag subunit 201 through the third air pump assembly 2025.

In the sinking working state, the first two-position three-way valve assembly 2026 is in the power-off state, the second two-position three-way valve assembly 2027 and the third air pump assembly 2025 are in the power-on working state, and the air in the airbag subunit 201 enters the third air pump assembly 2025 and is discharged through the third air pump assembly 2025, the first two-position three-way valve assembly 2026 and the air inlet and outlet subunit 204.

Referring back to FIG. 1, the main control unit 10 controls the sinking and floating control unit 20 based on the detection results of the waterline detection unit 30, the posture detection unit 40 and the distance measurement unit 50 will be further described.

The waterline detection unit 30 is configured to detect the positional relationship between the swimming pool robot 1 and the waterline of the liquid surface of the swimming pool where the swimming pool robot 1 is located. Specifically, the waterline detection unit 30 includes an outlet water detection subunit 301 and a proximity waterline detection subunit 302. The outlet water detection subunit 301 is configured to detect whether at least a part of the swimming pool robot 1 has come out of water. In one embodiment of the present disclosure, the outlet water detection subunit 301 is configured by, for example, a capacitive sensor or an ultrasonic ranging device. The proximity waterline detection subunit 302 is configured to detect whether the swimming pool robot 1 has crawled to a distance less than or equal to a predetermined distance from the waterline (for example, the predetermined distance is 10 cm to 20 cm). In one embodiment of the present disclosure, the proximity waterline detection subunit 302 is configured by, for example, an ultrasonic ranging device.

In one embodiment of the present disclosure, when the outlet water detection subunit 301 detects that at least a part of the swimming pool robot 1 has come out of the water, the inflation and deflation subunit 202 is controlled to start sucking air and the switch subunit 203 is controlled to open, so that the sinking and floating control unit 20 enters the floating working state.

Alternatively, in one embodiment of the present disclosure, when the proximity waterline detection subunit 302 detects that the swimming pool robot 1 has crawled to the distance less than or equal to the predetermined distance from the waterline, the inflation and deflation subunit 202 is controlled to start sucking air, and when the outlet water detection subunit 301 detects that at least a part of the swimming pool robot 1 has come out of the water, the switch subunit 203 is controlled to open, so that the sinking and floating control unit 20 enters the floating working state. In this case, the inflation and deflation subunit 202 and the switch subunit 203 are controlled to open in stages based on the detection of the outlet water detection subunit 301 and the proximity waterline detection subunit 302, and the air in the air pipe is filled into the airbag subunit 201 in advance, thereby further improving the working efficiency of the sinking and floating control unit 20.

Further, in response to the outlet water detection subunit 301 detecting that at least a part of the swimming pool robot 1 enters underwater again, the inflation and deflation subunit 202 and the switch subunit 203 are controlled to be closed. In this state, the swimming pool robot 1 remains floating. Alternatively, in one embodiment of the present disclosure, in response to that the outlet water detection subunit 301 does not detect that at least a part of the swimming pool robot 1 enters underwater again after the sinking and floating control unit 20 enters the floating working state for a predetermined time (for example, 40 seconds), the inflation and deflation subunit 202 and the switch subunit 203 are controlled to be closed. In another embodiment of the present disclosure, after the sinking and floating control unit 20 enters the floating working state, the outlet water detection subunit 301 stops working, and after a predetermined time (for example, 40 seconds), the inflation and deflation subunit 202 and the switch subunit 203 are controlled to be closed.

In this case, inflation and deflation subunit 202 and switch subunit 203 are prevented from inflating the airbag subunit 201 for a long time, and airbag subunit 201 is protected from being damaged.

The posture detection unit 40 is configured to detect a posture of the swimming pool robot 1. In one embodiment of the present disclosure, the posture detection unit 40 is configured by, for example, an inertial sensor (IMU). The main control unit 10 controls the waterline detection unit to start to perform the detection of the positional relationship when posture detection results of the posture detection unit 40 meet a first predetermined condition (for example, changing from a state parallel to the bottom surface of the swimming pool to a state parallel to the side wall of the swimming pool). In one embodiment of the present disclosure, in the floating working state, in response to the posture detection unit 40 detecting that the posture of the swimming pool robot 1 meets a second predetermined condition (for example, changing from a state parallel to the side wall of the swimming pool to a state parallel to the bottom surface of the swimming pool), the inflation and deflation subunit 202 and the switch subunit 203 are controlled to be closed. Further, after the sinking and floating control unit 20 enters the floating working state for a predetermined time, the inflation and deflation subunit 202 and the switch subunit 203 are controlled to be closed. Alternatively, in response to a predetermined time after the sinking and floating control unit 20 enters the floating working state, if the posture detection unit 40 does not detect that the posture of the swimming pool robot 1 meets the second predetermined condition, the inflation and deflation subunit 202 and the switch subunit 203 are controlled to be closed.

The distance measurement unit 50 performs distance measurement to control the swimming pool robot 1 to find the nearest side wall or slope in response to the operational requirement information of the swimming pool robot 1. For example, the swimming pool robot 1 rotates once in situ to detect a distance between the swimming pool robot 1 and each side wall of the swimming pool where the swimming pool robot 1 is located, so as to determine the nearest side wall or slope. After that, the main control unit 10 controls the swimming pool robot 1 to move to the nearest side wall or slope, and further makes the swimming pool robot 1 crawl along the side wall or slope to move to a liquid surface of the swimming pool.

The map storage unit 60 is configured to store map data of the swimming pool. The main control unit 10 controls the swimming pool robot to find the nearest side wall or slope based on the map data in the map storage unit. The main control unit 10 controls the swimming pool robot 1 to move to the nearest side wall or slope, and further makes the swimming pool robot crawl along the side wall or slope to move to the liquid surface of the swimming pool.

The water pump unit 70 is configured to extract liquid in the swimming pool where the swimming pool robot 1 is located, and discharge the liquid to propel the swimming pool robot 1. When the swimming pool robot 1 performs cleaning work, the extracted liquid is discharged after being filtered inside the swimming pool robot 1. In the embodiment of the present disclosure described above, a power of the water pump unit 70 is changed in response to the sinking and floating control unit 20 entering the floating working state or the swimming pool robot climbing the side wall or slope. That is, when at least a part of the swimming pool robot 1 is out of the water, a running power of the water pump unit 70 is reduced, thereby reducing an adsorption force between the swimming pool robot 1 and the side wall or slope, and facilitating the swimming pool robot 1 to gradually enter a floating state with the inflation and deflation subunit 202 and the switch subunit 203 inflating the airbag subunit 201. In addition, in the process that the swimming pool robot 1 crawls along the side wall or slope until at least a part of the swimming pool robot 1 comes out of the water, the water pump unit 70 and a driving wheel of the swimming pool robot 1 jointly push the swimming pool robot 1 to move to the liquid surface of the swimming pool where the swimming pool robot 1 is located. Further, after the swimming pool robot 1 is in the floating state, the water pump unit 70 can be controlled to operate at an appropriate power based on the operational requirement information of the swimming pool robot 1 to perform cleaning work such as the waterline area.

Above, the swimming pool robot according to the embodiments of the present disclosure has been described with reference to FIG. 1 to FIG. 5. The swimming pool robot according to the embodiments of the present disclosure, the sinking and floating control of the swimming pool robot can be realized by inflating and deflating the airbag with the air above the water level line, thereby having a faster sinking and floating speed compared to the solution of changing a quality of the swimming pool robot itself to realize floating or sinking through water absorption and drainage, and simplifying the configuration of internal components. By monitoring the working state and the posture of the swimming pool robot based on operational requirements of the swimming pool robot, starting detecting the positional relationship between the swimming pool robot and the waterline of the liquid surface of the swimming pool where the swimming pool robot is located, and starting each component of the sinking and floating control unit in stages according to detection results of the positional relationship, more accurate floating and sinking control can be realized, and the correct posture of the swimming pool robot in the whole operational process can be ensured.

Figure 6:
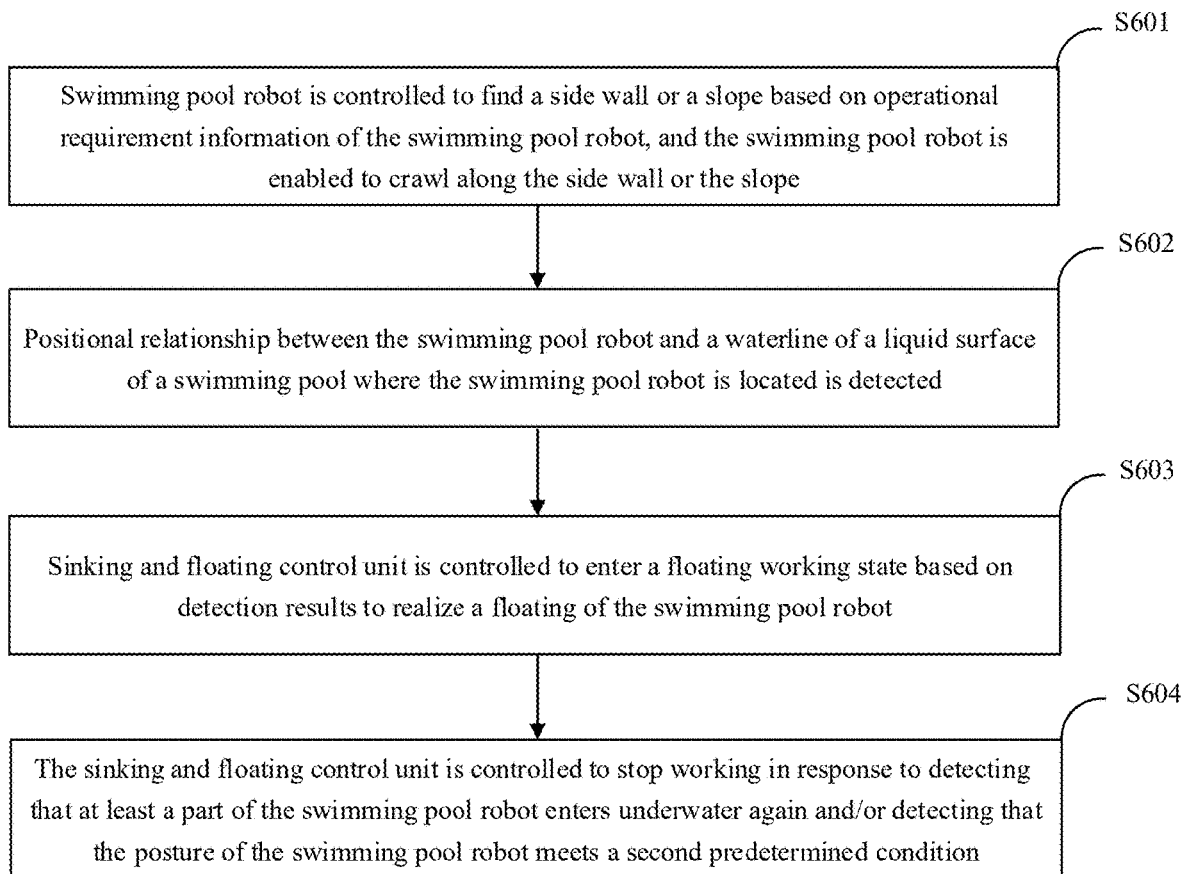
FIG. 6 is a flowchart illustrating a sinking and floating control method for a swimming pool robot according to an embodiment of the present disclosure.
Figure 7:
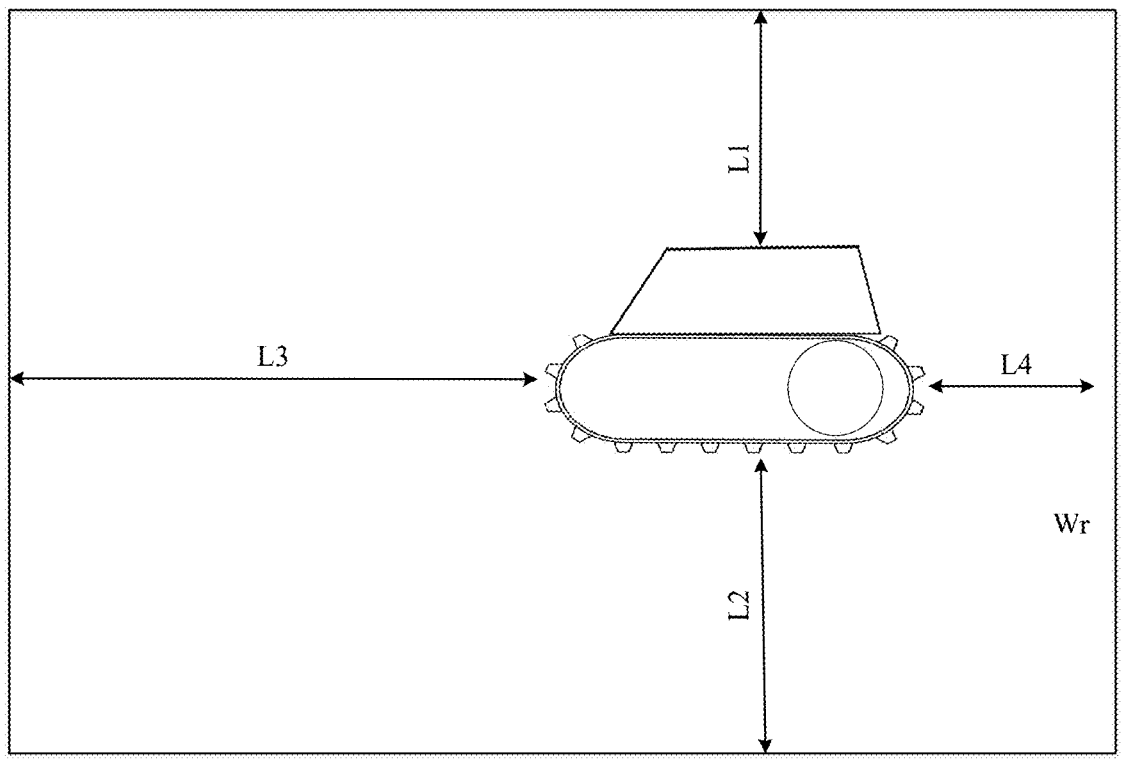
FIG. 7 is a schematic diagram illustrating a sinking and floating control method for a swimming pool robot according to an embodiment of the present disclosure.

Hereinafter, a sinking and floating control method for a swimming pool robot according to embodiments of the present disclosure will be described with further reference to FIG. 6 to FIG. 8E. FIG. 6 is a flowchart illustrating a sinking and floating control method for a swimming pool robot according to an embodiment of the present disclosure. FIG. 7 is a schematic diagram illustrating a sinking and floating control method for a swimming pool robot according to an embodiment of the present disclosure. FIG. 8A to FIG. 8E are schematic diagrams further illustrating a sinking and floating control method for a swimming pool robot according to an embodiment of the present disclosure.

As shown in FIG. 6, the sinking and floating control method for a swimming pool robot according to the embodiment of the present disclosure includes the following steps.

In step S601, a swimming pool robot is controlled to find a side wall or a slope based on operational requirement information of the swimming pool robot, and the swimming pool robot is enabled to crawl along the side wall or the slope.

In one embodiment of the present disclosure, the operational requirement information includes remote control command information sent by a user, clock information, operational task progress information, fault information, power information or swimming pool bottom environment information. That is, the remote control command information, the clock information, the operational task progress information, the fault information, the power information or the swimming pool bottom environment information instruct the swimming pool robot 1 to switch to a floating state to clean the waterline area, come out of water and charge or maintain; or instruct the swimming pool robot 1 to switch to a sinking state to clean the pool bottom and/or the sidewall area.

In one embodiment of the present disclosure, the distance measurement unit 50 performs distance measurement to control the swimming pool robot 1 to find the nearest side wall or slope in response to the operational requirement information of the swimming pool robot 1. Specifically, referring to FIG. 7, the swimming pool robot 1 rotates once in situ to detect distances L1, L2, L3 and L4 among the swimming pool robot 1 and side walls of the swimming pool where the swimming pool robot 1 is located, so as to determine the nearest side wall Wr. The distance between the swimming pool robot 1 and the side wall Wr is L4, and L4 is smaller than any of L1, L2 and L3. After that, the main control unit 10 controls the swimming pool robot 1 to move to the nearest side wall Wr, and further makes the swimming pool robot 1 crawl along the side wall Wr to move to the liquid surface of the swimming pool.

Alternatively, the map storage unit 60 is configured to store map data of the swimming pool. The main control unit 10 controls the swimming pool robot 1 to find the nearest side wall Wr based on the map data in the map storage unit 60. The main control unit 10 controls the swimming pool robot 1 to move to the nearest side wall Wr, and further makes the swimming pool robot 1 crawl along the side wall Wr to move to the liquid surface of the swimming pool.

In one embodiment of the present disclosure, when the swimming pool robot 1 performs cleaning work at the bottom of the swimming pool, the water pump unit 70 extracts the liquid in the swimming pool where the swimming pool robot 1 is located, the extracted liquid is discharged after being filtered inside the swimming pool robot 1, and the discharged liquid pushes the swimming pool robot 1. When the swimming pool robot 1 crawls along the side wall Wr, the water pump unit 70 and the driving wheel of the swimming pool robot 1 jointly push the swimming pool robot 1 to move to the liquid surface Wt of the swimming pool where the swimming pool robot 1 is located.

In step S602, a positional relationship between the swimming pool robot and a waterline of a liquid surface of a swimming pool where the swimming pool robot is located is detected.

Figure 8A:
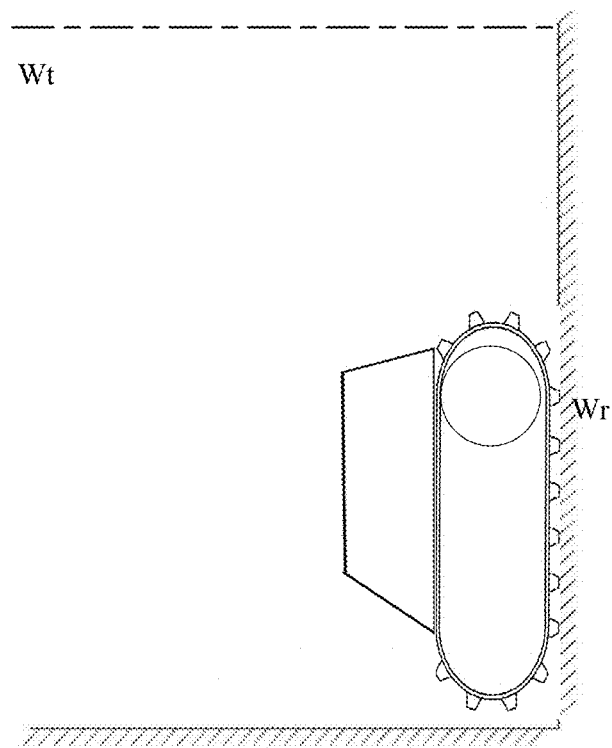
FIG. 8A to FIG. 8E are schematic diagrams further illustrating a sinking and floating control method for a swimming pool robot according to an embodiment of the present disclosure.
Figure 8B:
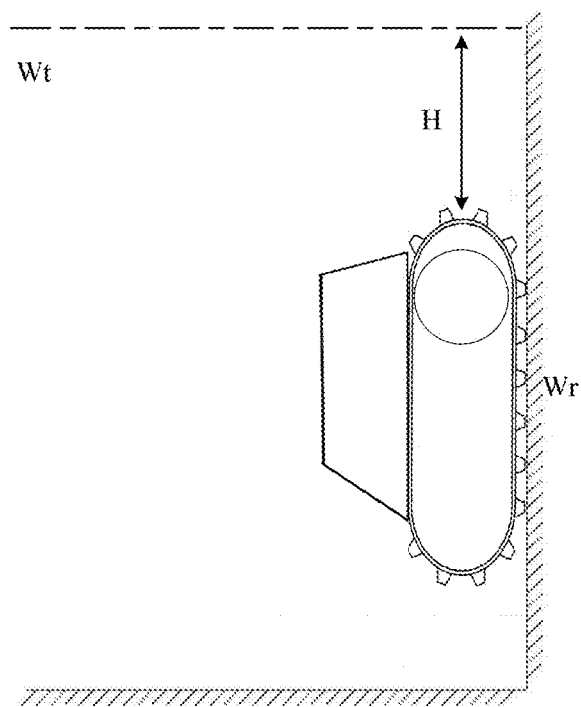
Figure 8C:
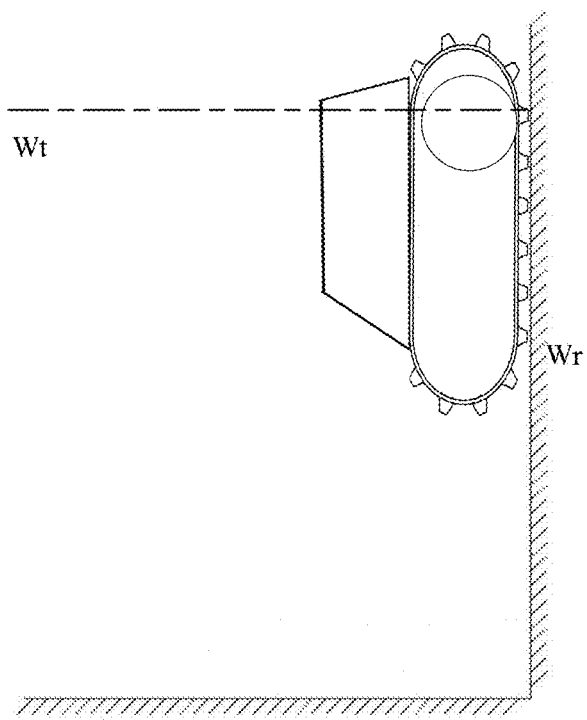

In one embodiment of the present disclosure, a posture of the swimming pool robot 1 is detected by a posture detection unit 40 configured by an inertial sensor (IMU). The main control unit 10 controls the waterline detection unit 30 to start to perform the detection of the positional relationship when posture detection results of the posture detection unit 40 meet a first predetermined condition (for example, changing from a state parallel to the bottom surface of the swimming pool to a state parallel to the side wall of the swimming pool). That is, as shown in FIG. 8A, when the swimming pool robot 1 crawls along the side wall Wr to move to the liquid surface of the swimming pool where the swimming pool robot 1 is located, the detection of the positional relationship between the swimming pool robot 1 and the waterline Wt of the liquid surface of the swimming pool where the swimming pool robot 1 is located is performed.

As described above, the waterline detection unit 30 is configured to detect the positional relationship between the swimming pool robot 1 and the waterline Wt of the liquid surface of the swimming pool where the swimming pool robot 1 is located. Specifically, the waterline detection unit 30 includes an outlet water detection subunit 301 and a proximity waterline detection subunit 302. The outlet water detection subunit 301 is configured to detect whether at least a part of the swimming pool robot 1 has come out of water. In one embodiment of the present disclosure, the outlet water detection subunit 301 is configured by, for example, a capacitive sensor or an ultrasonic ranging device. The proximity waterline detection subunit 302 is configured to detect whether the swimming pool robot 1 has crawled to a distance less than or equal to a predetermined distance from the waterline (for example, the predetermined distance is 10 cm to 20 cm). In one embodiment of the present disclosure, the proximity waterline detection subunit 302 is configured by, for example, an ultrasonic ranging device.

In step S603, a sinking and floating control unit is controlled to enter a floating working state based on detection results to realize a floating of the swimming pool robot.

In one embodiment of the present disclosure, when the outlet water detection subunit 301 detects that at least a part of the swimming pool robot 1 has come out of the water (for example, a state shown in FIG. 8C), the inflation and deflation subunit 202 is controlled to start sucking air and the switch subunit 203 is controlled to open, so that the sinking and floating control unit 20 enters the floating working state.

Alternatively, in one embodiment of the present disclosure, when the proximity waterline detection subunit 302 detects that the swimming pool robot 1 has crawled to the distance less than or equal to the predetermined distance from the waterline (for example, a state shown in FIG. 8B, the swimming pool robot 1 has crawled to a distance less than or equal to a predetermined distance H), the inflation and deflation subunit 202 is controlled to start sucking air, and when the outlet water detection subunit 301 detects that at least a part of the swimming pool robot 1 has come out of the water (for example, the state shown in FIG. 8C), the switch subunit 203 is controlled to open, so that the sinking and floating control unit 20 enters the floating working state. In this case, the inflation and deflation subunit 202 and the switch subunit 203 are controlled to open in stages based on the detection of the outlet water detection subunit 301 and the proximity waterline detection subunit 302, and the air in the air pipe is filled into the airbag subunit 201 in advance, thereby further improving the working efficiency of the sinking and floating control unit 20.

Figure 8D:
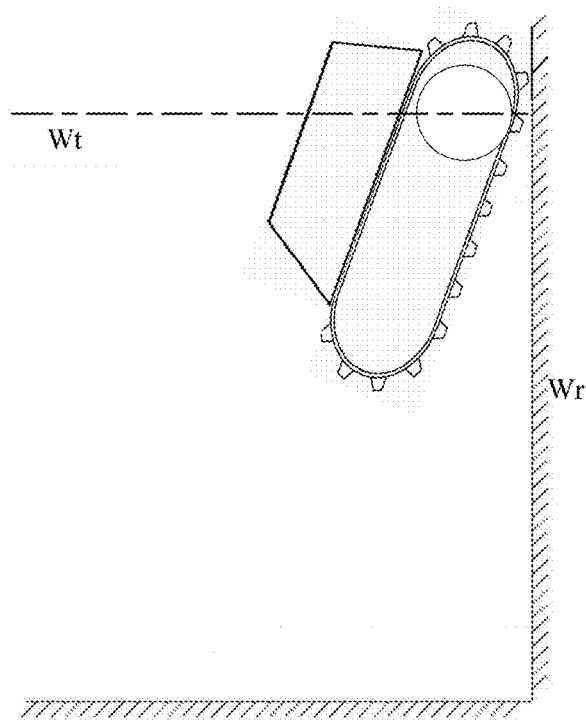

In one embodiment of the present disclosure, a power of the water pump unit 70 is changed in response to the sinking and floating control unit 20 entering the floating working state. That is, when at least a part of the swimming pool robot 1 is out of the water, a running power of the water pump unit 70 is reduced, thereby reducing an adsorption force between the swimming pool robot 1 and the side wall or slope, and facilitating the swimming pool robot 1 to gradually enter a floating state with the inflation and deflation subunit 202 and the switch subunit 203 inflating the airbag subunit 201. For example, as shown in FIG. 8D, as the sinking and floating control unit 20 enters the floating working state, an end of the swimming pool robot 1 that does not come out of the water gradually floats.

In step S604, the sinking and floating control unit is controlled to stop working in response to detecting that at least a part of the swimming pool robot enters underwater again and/or detecting that the posture of the swimming pool robot meets a second predetermined condition.

Figure 8E:
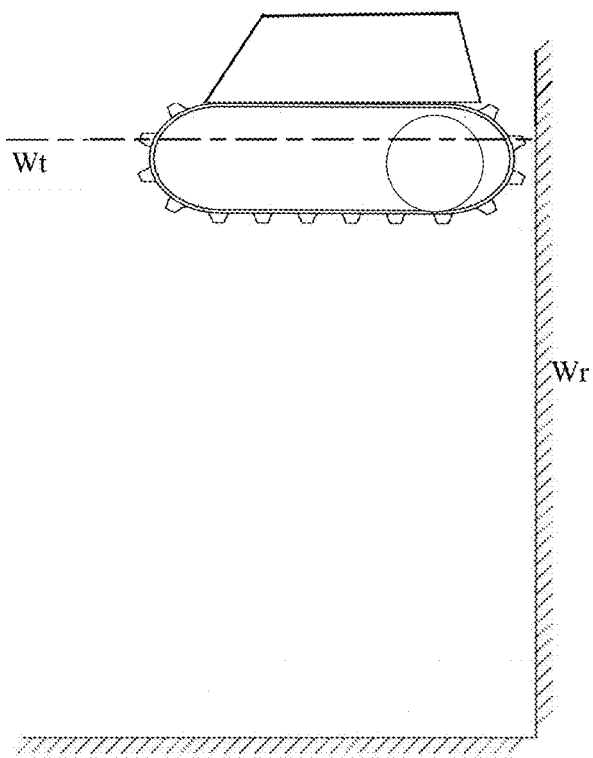

In one embodiment of the present disclosure, in the floating working state, in response to the outlet water detection subunit 301 detecting that at least a part of the swimming pool robot 1 enters underwater again, the inflation and deflation subunit 202 and the switch subunit 203 are controlled to be closed. Alternatively, in response to the posture detection unit 40 detecting that the posture of the swimming pool robot 1 meets a second predetermined condition (for example, changing from a state parallel to the side wall of the swimming pool to a state parallel to the bottom surface of the swimming pool), the inflation and deflation subunit 202 and the switch subunit 203 are controlled to be closed. For example, as shown in FIG. 8E, when the swimming pool robot 1 gradually floats to the state parallel to the bottom surface of the swimming pool, that is, when the swimming pool robot 1 enters the floating state, the sinking and floating control unit is controlled to stop working.

In addition, in response to the sinking and floating control unit 20 entering the floating working state, the outlet water detection subunit 301 and the posture detection unit 40 are closed, and after a predetermined time (for example, 40 seconds), the inflation and deflation subunit 202 and the switch subunit 203 are controlled to be closed. Alternatively, in one embodiment of the present disclosure, in response to that the outlet water detection subunit 301 does not detect that at least a part of the swimming pool robot 1 enters underwater again after the sinking and floating control unit 20 enters the floating working state for a predetermined time (for example, 40 seconds), the inflation and deflation subunit 202 and the switch subunit 203 are controlled to be closed. Alternatively, in response to the predetermined time after the sinking and floating control unit 20 enters the floating working state, if the posture detection unit 40 does not detect that the posture of the swimming pool robot 1 meets the second predetermined condition, the inflation and deflation subunit 202 and the switch subunit 203 are controlled to be closed. In this case, inflation and deflation subunit 202 and switch subunit 203 are prevented from inflating the airbag subunit 201 for a long time, and airbag subunit 201 is protected from being damaged.

Further, after the swimming pool robot 1 is in the floating state, the water pump unit 70 can be controlled to operate at an appropriate power based on the operational requirement information of the swimming pool robot 1 to perform cleaning work such as the waterline area.

Above, the controllable sinking and floating swimming pool robot and the sinking and floating control method for the swimming pool robot according to embodiments of the present disclosure are described with reference to the drawings, the sinking and floating control of the swimming pool robot can be realized by inflating and deflating the airbag with the air above the water level line, thereby having a faster sinking and floating speed compared to the solution of changing a quality of the swimming pool robot itself to realize floating or sinking through water absorption and drainage, and simplifying the configuration of internal components. In the sinking and floating control method, by monitoring the working state and the posture of the swimming pool robot based on operational requirements of the swimming pool robot, starting detecting the positional relationship between the swimming pool robot and the waterline of the liquid surface of the swimming pool where the swimming pool robot is located, and starting each component of the sinking and floating control unit in stages according to detection results of the positional relationship, more accurate floating and sinking control can be realized, and the correct posture of the swimming pool robot in the whole operational process can be ensured.

The above describes basic principles of the present disclosure with reference to specific embodiments. However, the advantages, effects, and the like mentioned in the present disclosure are merely examples but not limitations. These advantages, effects, and the like cannot be considered to be necessary for the embodiments of the present disclosure. In addition, the specific details disclosed above are only for illustrative purposes and easy-to-understand functions rather than limitation, and the foregoing details do not limit the present disclosure for implementation of the foregoing specific details.

The block diagrams of the device, apparatus, equipment, and system involved in the present disclosure are merely illustrative examples and are not intended to require or imply that the device, apparatus, equipment, and system need to be connected, arranged, and configured in the manner shown in the block diagrams. Those skilled in the art realize that the device, apparatus, equipment, and system can be connected, arranged, and configured in any manner. Terms such as "include", "comprise", "have", and the like are open terms that mean "including but not limited to" and may be used interchangeably. The terms "or" and "and" used herein refer to the terms "and/or" and may be used interchangeably, unless the context clearly dictates otherwise. The expression "such as" used herein refers to the phrase "such as but not limited to" and may be used interchangeably with "such as".

In addition, as used herein, "or" used in a listing of items beginning with "at least one" indicates a separate listing. Therefore, for example, a listing of "at least one of A, B, or C" means A, or B or C, or AB or AC or BC, or ABC (that is, A and B and C). In addition, the word "exemplary" does not mean that the described example is preferred or better than other examples.

In the system and method of the present disclosure, the components or steps may be decomposed and/or recombined. These decompositions and/or recombinations shall be regarded as equivalent solutions of the present disclosure.

Various changes, substitutions, and alterations may be made to the technology described herein without departing from the technology taught by the appended claims. In addition, the scope of the claims of the present disclosure is not limited to the foregoing specific aspects such as the processing, the machine, the manufacturing, the event composition, the means, the methods, and the actions. Existing or to-be-developed processing, machines, manufacturing, event composition, means, methods, or actions later performing substantially the same functions or achieving substantially the same results as the corresponding aspects described herein may be used. Therefore, the attached claims include such processing, machine, manufacturing, event composition, means, methods or actions within its scope.

The foregoing description of the disclosed aspects is provided to enable a person skilled in the art to make modifications to or use the present disclosure. Various modifications to these aspects are apparent to a person skilled in the art, and the general principles defined herein can be applied to other aspects without departing from the scope of the present disclosure. Therefore, the present disclosure is not intended to be limited to the aspects shown herein but in accordance with the widest scope consistent with the principles and novel features disclosed herein.

The foregoing description has been given for the purposes of illustration and description. In addition, this description is not intended to limit the embodiments of the present disclosure to the form disclosed herein. Although a plurality of example aspects and embodiments have been discussed above, those skilled in the art realize some variations, modifications, changes, additions, and sub-combinations thereof.

The invention claimed is:

1. A controllable sinking and floating swimming pool robot, comprising:
   a sinking and floating control unit configured to control a swimming pool robot to float and sink;
   a waterline detection unit configured to detect a positional relationship between the swimming pool robot and a waterline of a liquid surface of a swimming pool where the swimming pool robot is located;
   a main control unit configured to control a working state of the sinking and floating control unit; and
   a distance measurement unit or a map storage unit, wherein the main control unit controls the swimming pool robot to find the nearest side wall or the nearest slope based on distance measurement results of the distance measurement unit or map data in the map storage unit,
   wherein the main control unit is capable of controlling the swimming pool robot to find a side wall or a slope based on operational requirement information of the swimming pool robot and enabling the swimming pool robot to crawl along the side wall or the slope;
   controlling the waterline detection unit to detect the positional relationship between the swimming pool robot and the waterline of the liquid surface of the swimming pool where the swimming pool robot is located; and
   controlling the sinking and floating control unit to enter a floating working state based on detection results to realize a floating of the swimming pool robot.

2. The controllable sinking and floating swimming pool robot according to claim 1, further comprising a posture detection unit configured to detect a posture of the swimming pool robot, wherein the main control unit controls the waterline detection unit to start detecting the positional relationship in response to the posture meeting a first predetermined condition.

3. The controllable sinking and floating swimming pool robot according to claim 1, wherein the operational requirement information comprises remote control command information sent by a user, clock information, operational task progress information, fault information, power information or swimming pool bottom environment information.

4. The controllable sinking and floating swimming pool robot according to claim 1, wherein the waterline detection unit comprises an outlet water detection subunit configured to detect whether at least a part of the swimming pool robot has come out of water.

5. The controllable sinking and floating swimming pool robot according to claim 1, wherein the waterline detection unit further comprises a proximity waterline detection subunit configured to detect whether the swimming pool robot has crawled to a distance less than or equal to a predetermined distance from the waterline.

6. The controllable sinking and floating swimming pool robot according to claim 4, wherein the sinking and floating control unit comprises an inflation and deflation subunit and a switch subunit, wherein in response to the outlet water detection subunit detecting that at least a part of the swimming pool robot has come out of the water, the inflation and deflation subunit is controlled to start sucking air and the switch subunit is controlled to open, so that the sinking and floating control unit enters the floating working state.

7. The controllable sinking and floating swimming pool robot according to claim 4, wherein the sinking and floating control unit comprises an inflation and deflation subunit and a switch subunit, wherein in response to the proximity waterline detection subunit detecting that the swimming pool robot has crawled to the distance less than or equal to the predetermined distance from the waterline, the inflation and deflation subunit is controlled to start sucking air, and in response to the outlet water detection subunit detecting that at least a part of the swimming pool robot has come out of the water, the switch subunit is controlled to open, so that the sinking and floating control unit enters the floating working state.

8. The controllable sinking and floating swimming pool robot according to claim 4, wherein the sinking and floating control unit further comprises an airbag subunit connected to the inflation and deflation subunit, wherein the airbag subunit is connected to or disconnected from outside atmosphere through the inflation and deflation subunit and the switch subunit,
   and wherein the sinking and floating control unit further comprises an air inlet and outlet subunit, wherein the switch subunit is connected to the outside atmosphere through the air inlet and outlet subunit.

9. The controllable sinking and floating swimming pool robot according to claim 1, wherein the main control unit is further capable of controlling the sinking and floating control unit to enter a sinking working state based on the operational requirement information of the swimming pool robot to realize a sinking of the swimming pool robot.

10. The controllable sinking and floating swimming pool robot according to claim 9, wherein the sinking and floating control unit comprises an inflation and deflation subunit, a switch subunit and an airbag subunit connected to the inflation and deflation subunit, controlling the sinking and floating control unit to enter the sinking working state comprises controlling the switch subunit to open and controlling the inflation and deflation subunit to discharge air in the airbag subunit.

11. The controllable sinking and floating swimming pool robot according to claim 6, wherein the inflation and deflation subunit comprises an air pump assembly, and the switch subunit comprises an electromagnetic valve assembly or a two-position three-way valve assembly.

12. The controllable sinking and floating swimming pool robot according to claim 6, wherein in response to the outlet water detection subunit detecting that at least a part of the swimming pool robot enters underwater again and/or the posture detection unit detecting that the posture of the swimming pool robot meets a second predetermined condition, the inflation and deflation subunit and the switch subunit are controlled to be closed.

13. The controllable sinking and floating swimming pool robot according to claim 6, wherein the inflation and deflation subunit and the switch subunit are controlled to be closed after the sinking and floating control unit enters the floating working state for a predetermined time.

14. The controllable sinking and floating swimming pool robot according to claim 6, further comprising a water pump unit configured to pump liquid in the swimming pool where the swimming pool robot is located and discharge the liquid to drive the swimming pool robot,
wherein a power of the water pump unit is changed after the sinking and floating control unit enters the floating working state or after the swimming pool robot climbs the side wall or the slope.

15. A sinking and floating control method for a swimming pool robot, comprising:
controlling a swimming pool robot to find a side wall or a slope based on operational requirement information of the swimming pool robot, and enabling the swimming pool robot to crawl along the side wall or the slope;
detecting a positional relationship between the swimming pool robot and a waterline of a liquid surface of a swimming pool where the swimming pool robot is located; and
controlling a sinking and floating control unit to enter a floating working state based on detection results to realize a floating of the swimming pool robot;
wherein the swimming pool robot comprises a distance measurement unit or a map storage unit, and the sinking and floating control method further comprises controlling the swimming pool robot to find the nearest side wall or the nearest slope based on distance measurement results of the distance measurement unit or map data in the map storage unit.

16. The sinking and floating control method for the swimming pool robot according to claim 15, wherein detecting the positional relationship between the swimming pool robot and the waterline of the liquid surface of the swimming pool where the swimming pool robot is located comprises:
starting detecting the positional relationship in response to a posture of the swimming pool robot meeting a first predetermined condition.

17. The sinking and floating control method for the swimming pool robot according to claim 16, wherein the operational requirement information comprises remote control command information sent by a user, clock information, operational task progress information, fault information, power information or swimming pool bottom environment information.

18. The sinking and floating control method for the swimming pool robot according to claim 17, wherein controlling the sinking and floating control unit to enter the floating working state based on detection results to realize the floating of the swimming pool robot comprises:
controlling the sinking and floating control unit to enter the floating working state in response to detecting that at least a part of the swimming pool robot has come out of water.

19. The sinking and floating control method for the swimming pool robot according to claim 17, further comprising:
controlling the sinking and floating control unit to stop working in response to detecting that at least a part of the swimming pool robot enters underwater again and/or detecting that the posture of the swimming pool robot meets a second predetermined condition.

20. The sinking and floating control method for the swimming pool robot according to claim 15, wherein the swimming pool robot comprises a water pump unit configured to pump liquid in the swimming pool where the swimming pool robot is located and discharge the liquid to drive the swimming pool robot,
wherein the sinking and floating control method further comprises changing a power of the water pump unit after the sinking and floating control unit enters the floating working state or after the swimming pool robot climbs the side wall or the slope.

\* \* \* \* \*